(12) United States Patent
Wang et al.

(10) Patent No.: US 7,427,754 B2
(45) Date of Patent: Sep. 23, 2008

(54) TELEGRAPH SIGNAL MICROSCOPY DEVICE AND METHOD

(75) Inventors: Kang L. Wang, Santa Monica, CA (US); Fei Liu, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 211 days.

(21) Appl. No.: 11/279,540

(22) Filed: Apr. 12, 2006

(65) Prior Publication Data
US 2006/0231754 A1 Oct. 19, 2006

Related U.S. Application Data

(60) Provisional application No. 60/671,435, filed on Apr. 14, 2005.

(51) Int. Cl.
*G01N 23/00* (2006.01)
(52) U.S. Cl. .................. 250/306; 250/307; 977/876; 977/875; 977/860; 977/849; 977/840
(58) Field of Classification Search .............. 250/309, 250/307, 306, 526; 977/876, 875, 860, 849, 977/840
See application file for complete search history.

(56) References Cited

U.S. PATENT DOCUMENTS 5,619,139 A * 4/1997 Holczer et al. .............. 324/318
6,995,367 B2 * 2/2006 Miyamoto .................. 250/306
7,312,095 B1 * 12/2007 Gabriel et al. ............... 438/49

OTHER PUBLICATIONS

McEuen "Single-wall carbon nanotubes" Physics World Jun. 2000 p. 31-36.*
Fei, et al. "Giant random telegraph signals in the carbon nanotubes as a single defect probe" Appl. Phys. Lett. 86, 163102 (2005).*
Albrecht, T. R., et al., Microfabrication of cantilever styli for the atomic force microscope, J. Vac. Sci. Technol. A, vol. 8, No. 4, pp. 3386-3396, Jul./Aug. 1990.
Cui, Yi, et al., Doping and Electrical Transport in Silicon Nanowires, J. Phys., Chem. B, vol. 104, No. 22, pp. 5213-5216, Jun. 28, 2000.

(Continued)

*Primary Examiner*—Jack I. Berman
*Assistant Examiner*—Michael Maskell
(74) *Attorney, Agent, or Firm*—Vista IP Law Group LLP (57) ABSTRACT

A microscope device includes a probe having a dielectric material with a first side and a second side. First and second electrodes are disposed on the first side of the dielectric material. A nanotube connects the first and second electrodes. A gate electrode is disposed on the second side (e.g., backside) of the dielectric material. The device includes a stage adapted for holding a sample. The stage and probe are moveable with respect to one another such that the sample can be brought in close proximity to the nanotube. The device further includes current measurement circuitry for measuring current (e.g., Random Telegraph Signals) passing through the nanotube. The microscope device is able to identify and characterize single defects on the molecular or atomic scale. The probe device may be combined with spin resonance and/or optical systems such that the detection/mapping/manipulate of single spin and single photon could be achieved.

19 Claims, 6 Drawing Sheets

OTHER PUBLICATIONS

Liu, Fei, et al., Giant random Telegraph Signals in the Carbon Nanotubes as a Single Defect Probe, Applied Physics Letters 86, 163102, pp. 163102-1-163102-3 (2005).

Liu, Fei, et al., Determination of the Small Band Gap of Carbon Nanotubes Using the Ambipolar Random Telegraph Signal, Nano Letters, vol. 5, No. 7, pp. 1333-1336 (2005).

Yang, B., et al., Template-Directed Carbob Nanotube Network Using Self-Organized Si Nanocrystals, App. Phys. Lett. vol. 86, pp. 263107-1-263107-3 (2005).

* cited by examiner

TELEGRAPH SIGNAL MICROSCOPY DEVICE AND METHOD

REFERENCE TO RELATED APPLICATIONS

This Application claims priority to U.S. Provisional Patent Application No. 60/671,435 filed on Apr. 14, 2005. U.S. Provisional Patent Application No. 60/671,435 is incorporated by reference as if set forth fully herein.

FIELD OF THE INVENTION

The field of the invention generally relates microscopy devices and methods. More specifically, the field of the invention relates to microscopy devices and methods that utilize the detection and measurement of random telegraph signals (RTSs) in one-dimensional nanodevices such as carbon nanotubes (CNTs) and silicon (Si), germanium (Ge), and other nanowires to characterize and identify defects, atoms, and/or molecules in a sample.

BACKGROUND OF THE INVENTION

The semiconductor industry is increasingly being driven to decrease the size of semiconductor devices located on integrated circuits. For example, miniaturization is needed to accommodate the increasing density of circuits necessary for today's semiconductor products. As a result, there are continuing efforts to scale down the size of features formed using conventional CMOS processes. Moreover, the recent development of nanotechnology devices and methods has ushered in even smaller-sized devices. Because of this trend, there is a growing need for detection and characterization modalities that are able to detect and/or characterize defects in the materials used to form the semiconductor devices. Such detection and characterization often is required on the molecular or even atomic level. For example, atomic level interface imperfections and single defects in self-assembled nanowires and CNTs can dramatically affect performance Unfortunately, conventional capacitance-based defect characterization methods such as deep level transient spectroscopy (DLTS) and electron paramagnetic resonance (EPR) cannot be applied to nanodevices because of the lack of sensitivity due to the small capacitance inherent in nanodevices. Consequently, there is a need for a new microscope modality that is capable of identifying and characterizing molecular and/or atomic defects in nanodevices. A method and device is needed that is capable of realizing single defects with high sensitivity.

SUMMARY OF THE INVENTION

In a first aspect of the invention, a microscopy device is formed as a RTS-based nano-MOS probe. The probe is formed using a carbon nanotube or nanowire that is formed on a substantially defect-free dielectric material. The two ends of the carbon nanotube or nanowire are connected to two separate electrodes. In one aspect of the invention, the carbon nanotube or nanowire forms a tip between the two electrodes. The electrodes are used to measure RTS current flow through the carbon nanotube or nanowire. The backside of the substantially defect-free dielectric material includes a conductor that forms the control gate of the device. The control gate can then be used to tune the Fermi energy of the nanotube/nanowire in a certain range (e.g., tune the band alignment between the metal gate and the carbon nanotube or nanowire).

In one aspect of the invention, the probe is moveable relative to a sample. For example, the probe may be moveable in the x, y, z directions relative to a stationary stage. Alternatively, the probe may be stationary while the stage may be moveable in the x, y, z directions. The stage or probe may be coupled to a controller such as, for example, a computer that can be pre-programmed to move the tip of the probe adjacent to a test material. The electrodes may be coupled to measurement circuitry for measuring the current and/or voltage across the two electrodes connected to the nanotube/nanowire. During operation of the probe, the tip of the nanowire/nanotube is brought in proximity to a test surface. If the energy of a queried atom or molecule aligns with the probe's Fermi energy, then random telegraph signals through the nanowire/nanotube are generated. By observing the current through the nanowire/nanotube, energy information from the atom or molecule may be determined.

In one aspect of the invention, the probe is formed as a field effect transistor (FET). In this regard, the two electrodes connecting the nanotube or nanowire form the source and drain, respectively. The conductor on the backside of the substantially defect-free dielectric material forms the gate electrode. In addition, in one aspect of the invention, the nanotube is formed as a p-type semiconducting single-wall carbon nanotube. In yet another embodiment, the two electrodes are connected by a nanowire. The nanowire may be silicon-based, germanium-based, or some other material known to those skilled in the art.

According to one embodiment of the invention, a microscopy probe includes a substantially defect-free dielectric material having a first side and a second side. A first electrode and a second electrode are disposed on the first side the substantially defect-free dielectric material. The first and second electrodes are formed as the source and drain electrodes, respectively. A nanoconductor such as, for example, a nanotube or nanowire connects the first electrode to the second electrode. The nanoconductor includes a tip portion that is used to interact with the sample. A gate electrode is disposed on the second side of the substantially defect-free dielectric material. In this embodiment, the probe is formed as a FET-based structure.

The microscopy probe may further include a stage adapted to hold a test sample in close proximity to the probe. The probe and/or the stage may be moveable such that the sample can be scanned for defects. Preferably, either the probe or stage is moveable along three axes (i.e., along x, y, and z directions). The device further includes current measurement circuitry coupled to the first and second electrodes. The current measurement circuitry is used to measure source-drain current due to RTS. Likewise, the probe may include associated control circuitry for applying a biasing voltage to the gate electrode.

In one aspect of the invention, the underlying dielectric material is formed in a non-planar manner such that a tip region is formed. The nanoconductor (e.g., nanotube or nanowire) can then be formed over the dielectric material to conform to its shape. The tip region of the dielectric material is thus used to form the tip portion of the nanoconductor.

In yet another aspect of the invention, at least a portion of the nanotube is suspended between the first and second electrodes. The nanotube thus bridges the source and drain electrodes.

In still another aspect of the invention, the probe may be formed with an array of electrodes and multiple nanotubes. For example, an array of multiple nanoconductor probes may be positioned on one side of the dielectric material. The array may be formed by a pair of nanoconductors (the pair being parallel to one another). In this embodiment, once a local signal of interest is detected, the information about a specific molecule or atom may be extracted from the RTS amplitude differences of the parallel pairs of probes. The device may have a "fine scan" mode to search around the prospective defect location to obtain the maximum RTS amplitude which is indicative of the defect location.

In another aspect of the invention, the probe device may be integrated with imaging capabilities. For example, the probe may be integrated with atomic force microscopy functionality to permit material characterization in addition to three-dimensional spatial resolution of defects. In this aspect of the invention, both sample morphology images (obtained using AFM) and material information (obtained using telegraph signal microscopy device) could be obtained in a single device.

In another embodiment of the invention, a microscope device includes a probe formed from a dielectric material having first and second electrodes disposed on one side. A nanoconductor (e.g., nanotube or nanowire) is formed between the first and second electrodes as a conduction path. The nanoconductor may have a tip portion that is positioned in proximity to a sample. A gate electrode is formed on the backside of the dielectric material. The device further includes a stage adapted for holding sample, the stage being moveable relative to the probe. The microscope device further includes current measurement circuitry coupled to the first and second electrodes for measuring RTS current flow through the nanoconductor.

The device described above may also include imaging means for obtaining images of the sample. For example, the microscope device may include functionality similar to an atomic force microscope to enable multi-dimensional views of atoms and molecules.

In another aspect of the invention, a method of detecting defects in a sample includes the steps of providing a probe of the type described herein. The nanoconductor (e.g., nanowire or nanotube) is brought in close proximity to the sample. The current flow (RTS current) through the nanoconductor is then measured. The defect in the sample is then detected based at least in part on the measured current flow. In this method, the Fermi energy of the nanoconductor is adjusted by altering a voltage applied to the gate electrode. The detection step may advantageously determine defect energy and defect position. In connection with the current flow measurements, images may optionally be acquired of the surface to provide a multi-dimensional view of the surface.

It is one object of the invention to provide a new microscopic detection modality that relies on RTS measurements across a nanoconductor to identify and characterize defects in a sample. In this regard, it is an object of the invention to provide a defect characterization device and method for small scale nanodevices. The RTS-based microscopy devices and methods provide high sensitivity such that single molecular or atomic defects can be identified and characterized. It is a related object of the invention to provide microscopic modality that has a high signal-to-noise ratio even in small, nanoscale devices.

Further features and advantages will become apparent upon review of the following drawings and description of the preferred embodiments.

BRIEF DESCRIPTION OF THE DRAWINGS

FIG. 6b illustrates additional steps of the process flow diagram shown in FIG. 6a.

DETAILED DESCRIPTION OF THE PREFERRED EMBODIMENTS

Figures 1, 2A:
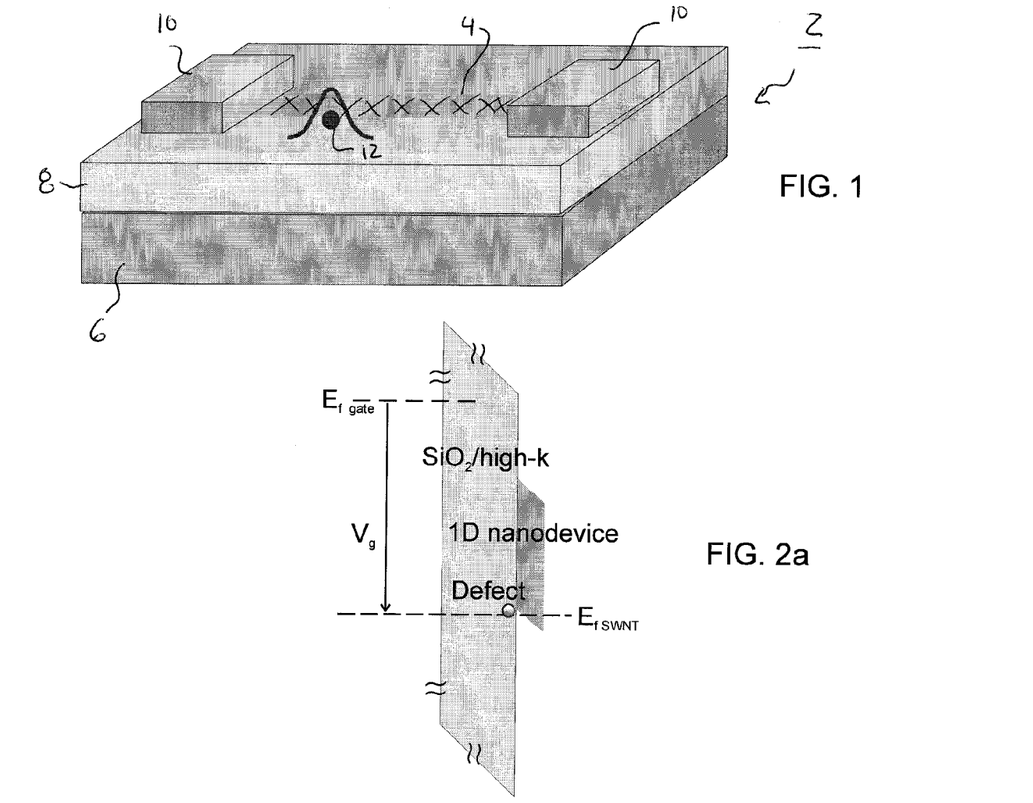
FIG. 1 illustrates a schematic representation of a one-dimensional FET having one defect formed inside the dielectric $SiO_2$ layer.
FIG. 2a illustrates a band diagram showing the alignment of the Fermi energy ($E_f$) of the one-dimensional nanoconductor with the defect ($E_T$) under a gate biasing voltage ($V_g$).

FIG. 1 illustrates a schematic representation of a carbon nanotube (CNT) FET 2 that is used to describe the operation of the preferred embodiments. The CNT FET 2 was fabricated by the chemical vapor deposition (CVD) of a p-type semiconducting single-wall carbon nanotube 4 (SWNT) on a silicon or other substrate 6 covered with a thermal oxide layer 8 as the gate dielectric layer having a thickness on the order of about 200 to about 500 nm. Catalyst islands of $Fe(NO_3)_3$ mixed with $Al_2O_3$ were deposited onto the substrate 6 and then heated up to 900° C. in the flow of a gaseous mixture of $CH_4$, $H_2$, and $C_2H_4$. A nanotube 4 with a length of several micrometers was formed. The diameter of the nanotube 4 is on the order of a few nanometers. After synthesis of the nanotube 4, electrodes 10 were formed on top of the nanotube by photolithographic (or E-beam) techniques followed by a subsequent Ti/Au (or Pd) deposition to form the contacts. FIG. 1 illustrates a single defect 12 formed in the $SiO_2$ or the $CNT/SiO_2$ interface. Generally, the Coulomb potential (represented by bell-shaped curve in FIG. 1) produced by the charged defect extends further than the diameter of the nanotube 4. This potential extension "pinches off" parts of the conducting channels, resulting in large RTSs. The RTS phenomena is attributed to the charging and discharging of a single defect 12 (e.g., molecule or atom) inside the gate dielectric 8 or at the interface of the gate dielectric 8 and the nanotube 4.

Due to the small nature of the CNT FET 2, the randomly generated conductance (RTSs) will happen when the Fermi energy of the nanotube 4 aligns with the single defect 12 in the dielectric 8. FIG. 2a illustrates a band diagram showing the alignment of the Fermi energy ($E_f$) with the defect ($E_T$) under a gate biasing voltage ($V_g$). With reference to FIG. 2a, at a small negative gate bias ($V_g$), the defect energy level is well below the Fermi level of the carbon nanotube 4 and no hopping/tunneling occurs. When a larger negative $V_g$ bias is applied, the Fermi energy in the carbon nanotube 4 channels moves towards the valence band and the $SiO_2$ band is also adjusted with respect to the Fermi level of carbon nanotube 4 (as shown in FIG. 2a). Consequently, the defect level and the CNT Fermi level move close to each other resulting in hopping and tunneling. Therefore, RTS is observed by measuring source-drain current ($I_{ds}$) via electrodes 10. The larger the absolute source-drain current corresponds to the defect 12 in its neutral state. In contrast, the lower state of source-drain current corresponds to the defect 12 in the positive/negative charged state. This is because when the defect is charged, the current level becomes lower due to Coulomb scattering. If the negative gate bias is too large, however, this will misalign the CNT Fermi level and defect level, resulting in no RTS. In short, the RTS is only present within a window of several kT electron volts from the closely aligned situation, where the CNT Fermi energy is the same as the single feature point (defect/atom/molecule) energy level. Because of this, from the gate dependence of RTS, identifying information of the defect/atom/molecule energy level can be obtained.

Figure 2B:
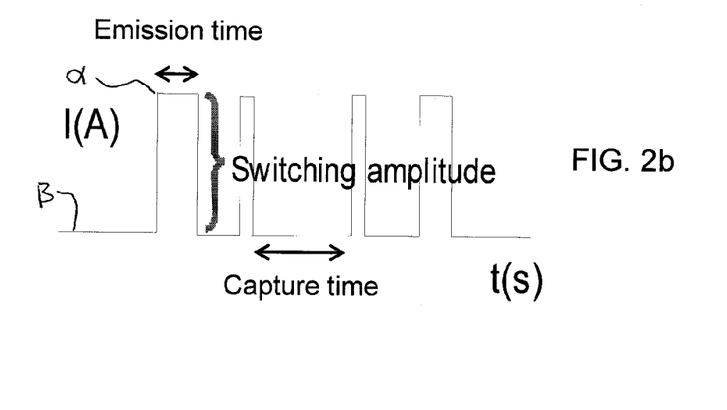
FIG. 2b illustrates the source-drain current (RTS current) switching as a function of time for the nano-MOS FET shown in FIG. 1.

With reference now to FIG. 2b, the CNT FET 2 with one defect 12 gives rise to a two-level switching of the drain current (RTSs). FIG. 2b illustrates the source-drain current (RTS current) switching as a function of time. As seen in FIG. 2b, there is a high current amplitude ($\alpha$) and a low current amplitude ($\beta$). The bi-level switching of amplitude levels is indicative of a single defect in the dielectric layer 8. Multi-level switching of amplitude levels is indicative of multiple defects. For example, the publication Liu et al., *Giant Random Telegraph Signals In The Carbon Nanotubes as a Single Defect Probe*, Applied Physics Letters 86, 163102 (2005) describes the four level switching characteristics of a two defect CNT FET 2. The above-noted Liu et al. publication is incorporated by reference as if set forth fully herein.

As explained above, because the defect potential substantially blocks carriers in the transport channel, a very high RTS signal (switching amplitude due to trapping and de-trapping) to noise (background current) ratio is achieved. The high signal-to-noise ratio is achieved because of the small channel width (on the order of nanometers) of the nanotube 4. In fact, the narrow channel width of the nanotube 4 enables single defect detection with high sensitivity. For example, in the CNT FET 2 of the type illustrated in FIG. 1, amplitudes of the RTSs up to 60% of the total current have been observed. Moreover, precise measurements could be obtained while operating at room temperature.

Figure 3:
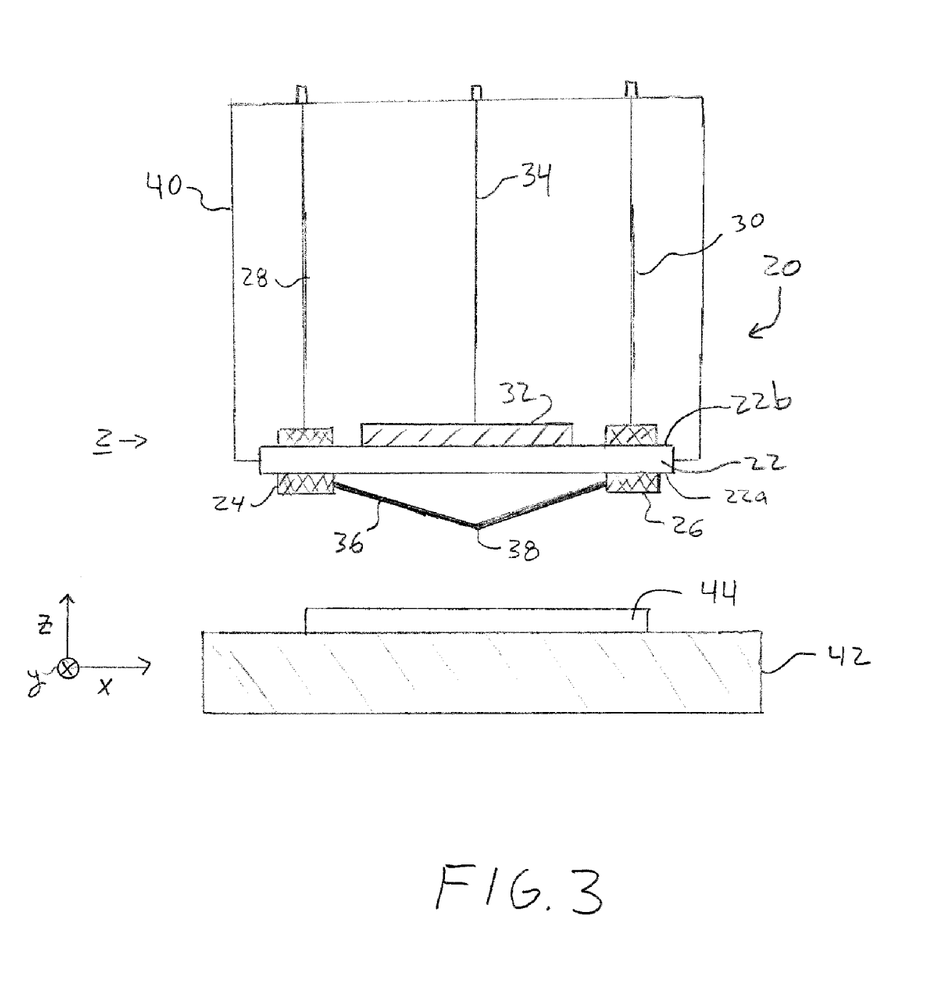
FIG. 3 illustrates a microscopy probe according to one embodiment of the invention.

With reference now to FIG. 3, a microscopy probe 20 according to one embodiment of the invention is provided. The microscopy probe 20 is capable of identifying one or more defects in a sample 44. In addition, the probe 20 is capable of characterizing the one or more defects in the sample 44. The characterization of the one or more defects may involve identifying the defect (e.g., the molecular or atomic identity). Generally, the microscopy probe 20 uses an inverted CNT FET 2 of the type disclosed in FIG. 1.

Referring to FIG. 3, the microscopy probe 20 includes a substantially defect-free dielectric material 22 having a first side 22a and a second side 22b. The dielectric material 22 may be formed from, for example, SiO$_2$. Of course, other dielectric materials having a relatively high dielectric constant (k) may also be used. The first side 22a of the dielectric material includes a first electrode 24 and a second electrode 26. The first and second electrodes 24, 26 act as source and drain electrodes, respectively, for the CNT FET 2 device. The first and second electrodes 24, 26 are formed from an electrically conductive material such as, for example, a metal. Exemplary metals usable for the first and second electrodes 24, 26 include gold, titanium, aluminum, and platinum depending on the material used for the nanoconductor 36. As seen in FIG. 3, the first and second electrodes 24, 26 preferably pass through (or around the exterior) of the substantially defect-free dielectric material 22. In this regard, a portion of the first and second electrodes 24, 26 terminate on the second side 22b of the dielectric material 22. On the second side 22b (e.g., backside) of the dielectric material 22, conductors 28, 30 connect to the first and second electrodes 24, 26. The conductors 28, 30 may be formed from electrically conductive materials such as, for instance, copper or aluminum. The conductors 28, 30 are, in turn, connected to voltage and current measurement circuitry (not shown in FIG. 3). The voltage circuitry is used to apply a source-drain biasing voltage ($V_{ds}$) to the first and second electrodes 24, 26. Such circuitry is known to those skilled in the art. In addition, the conductors 28, 30 are used to transport RTS current flow through the nanoconductor 36 (e.g., nanotube) to externally coupled current measurement circuitry. Such circuitry is well known to those skilled in the art. Because of the small currents involved, the RTS current likely needs to be amplified prior to measurement.

Still referring to FIG. 3, the second side 22b of the dielectric material 22 includes a gate electrode 32. The gate electrode 32 is used to apply a gate voltage ($V_g$) to the probe 20. The gate electrode 32 is formed from an electrically conductive material such as a metal. Those metals known to those skilled in the art that are usable in FET-type devices may be used. The gate electrode 32 is connected to conductor 34 that, in turn, is connected to a voltage circuitry (not shown in FIG. 3). In this regard, a gate voltage ($V_g$) can be applied to the gate electrode 32. Depending on the particular application of the probe 20, the gate voltage ($V_g$) may be held constant or varied, for example by stepping or sweeping. Thus, in one embodiment the backside of the probe 20 is coated with a metallic material to function as the gate electrode 32. Alternatively, the gate bias may be obtained by biasing the test sample 44 itself.

The probe device 20 further includes a nanoconductor 36 that connects the first and second electrodes 24, 26 (source and drain electrodes). In one embodiment of the invention, the nanoconductor 36 is formed as a nanotube. In other embodiments, the nanoconductor 36 may be formed as a nanowire. In still other embodiments, the probe 20 may take the form of a patterned, one-dimensional nano MOSFET. Referring back to the probe 20 of FIG. 3, the nanotube 36 is formed as a p-type single-walled carbon (SWNT) nanotube 36. The nanotube 36 is formed having a diameter on the order of about 1 to about 3 nm and lengths on the order of several micrometers. Of course, other dimensions are contemplated to fall within the scope of the invention. The nanotube 36 acts as a conduit for current flow between the first and second electrodes 24, 26. In one preferred aspect of the invention, the nanotube 36 includes a tip portion 38. The tip portion 38 of the nanotube 36 is that portion of the nanotube 36 that is furthest away from the first side 22a of the dielectric material 22. The tip portion 38 may be formed a point or apex in the nanotube 36.

The microscopy probe 20 may be formed within or integrated with a housing 40 or the like to hold the various components. As seen in FIG. 3, the microscopy probe 20 may be associated with a sample holder 42. The sample holder 42 secures or otherwise retains a sample 44 for measurement. In one embodiment, the sample holder 42 may be formed as a moveable stage 42. The stage 42 is preferably moveable in the x, y, and z directions. The stage 42 is able to move with a high degree of accuracy and precision such that molecular and/or atomic details can be investigated by the probe 20. High precision encoders and motors/servos of the type used in atomic force microscopy may be utilized to move the sample holder 42. Alternatively, the sample holder 42 may remain in a fixed location while the microscopy probe 20 is moved in the x, y, and z directions. Similar encoders and motor/servos may be utilized to move the microscopy probe 20. All that is needed is that the probe 20 is movable relative to the sample 44. Either one or both of the probe 20 and/or sample holder 42 may be moved to provide such relative movement.

In one embodiment, the microscope probe 20 may be integrated with an atomic force microscopy device. In this regard, the movable stage of the atomic force microscope may be used to move the sample 44 relative to the probe 20. By combining the microscope probe 20 with an atomic force microscope device, multi-dimensional views of the sample 44 (and any defect(s)) may be obtained.

Figure 4:
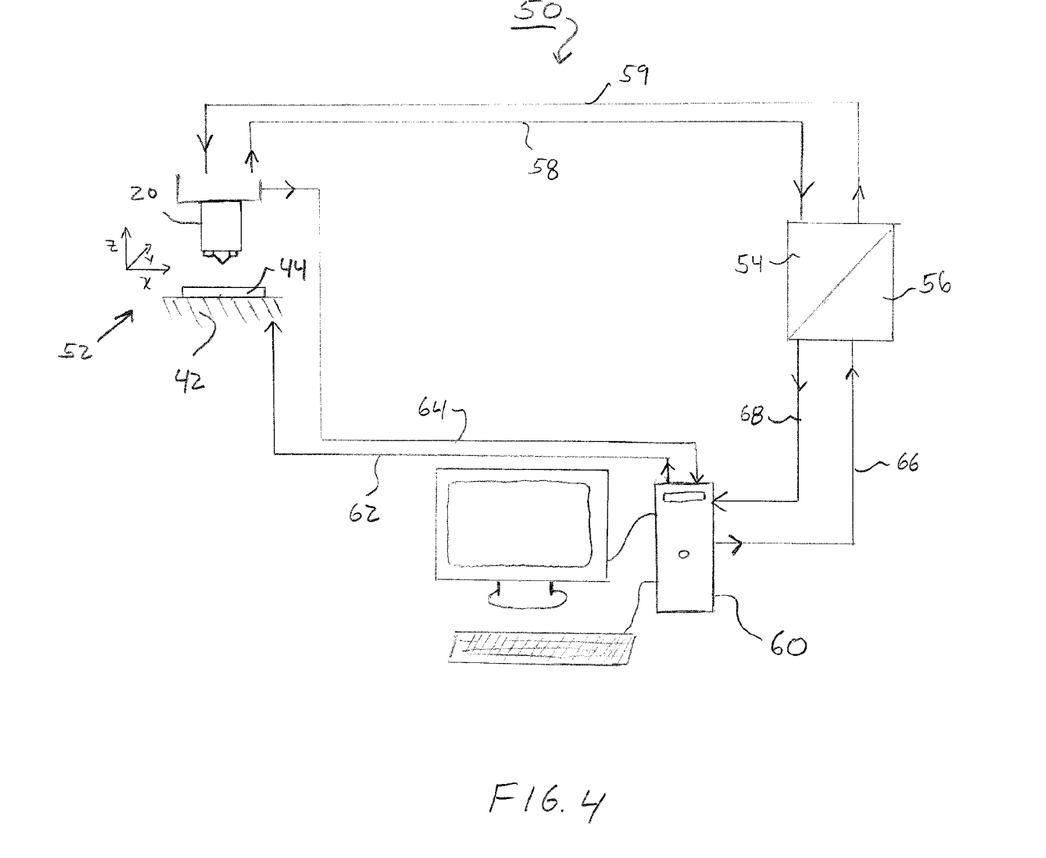
FIG. 4 illustrates a schematic view of a microscope system according to one aspect of the invention.

FIG. 4 schematically illustrates a microscope system 50 utilizing the microscope probe 20 of the type described herein. The system 50 includes a microscope portion 52 that includes at least the microscope probe 20 and the sample holder 42. The microscope portion 52 may include further functionality, for example, the ability to perform atomic force microscopy measurements. The system 50 further includes voltage and current circuitry 54, 56. The voltage circuitry 54 is used to apply a source-drain biasing voltage ($V_{ds}$) to the first and second electrodes 24, 26 of the probe 20. The voltage circuitry 54 is also used to apply a gate voltage ($V_g$) to the probe. The current measurement circuitry 56 is used to measure the drain-source current ($I_{ds}$) current of the RTSs generated within the nanotube 36. One or more signal lines 58, 59 are provided that communicate between the microscopy probe 20 and the circuitry 54, 56.

The microscope system 50 further includes a computer 60 that is used for data acquisition, data processing, as well as control of the microscope portion 52. For example, the computer 60 may control the relative movement between the microscope probe 20 and the sample holder 42 via signal line 62. Likewise, in certain embodiments, the computer 60 may receive image signals from the microscope portion 52. For example, visual images of the sample 44 from an imaging system (not shown) may be communicated to the computer via signal line 64. The imaging system may include, by way of example, an atomic force microscopy imaging system. The computer 60 may also be in communication with the voltage and current circuitry 54, 56 via signal lines 66, 68.

Figure 5A:
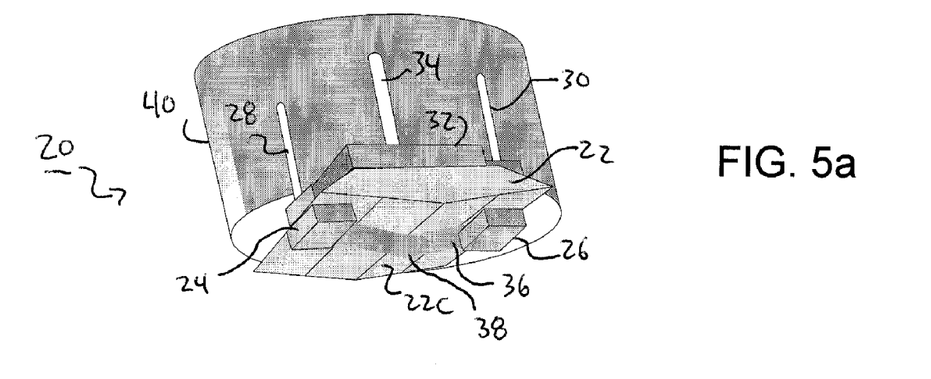
FIG. 5a illustrates a probe device according to one embodiment.

FIG. 5a illustrates one embodiment of a probe 20. In the probe 20 of FIG. 5a, the dielectric material 22 may be formed with a tip region 22c. The tip region 22c may be formed in the dielectric material 22 by selective etching or removal of the dielectric during the manufacturing process. For example, the tip region 22c may be protected from an etchant such that the lateral sides of the tip region 22c are selective removed. Of course, other processes known to those skilled in semiconductor fabrication techniques may be utilized to form the tip region 22c in the dielectric material 22. The carbon nanotube 36 is then formed on the surface of the dielectric material 22. Because the dielectric material 22 has a tip region, the nanotube 36 will conform to the surface of the dielectric material and, consequently, also have a tip portion 38.

Figure 5B:
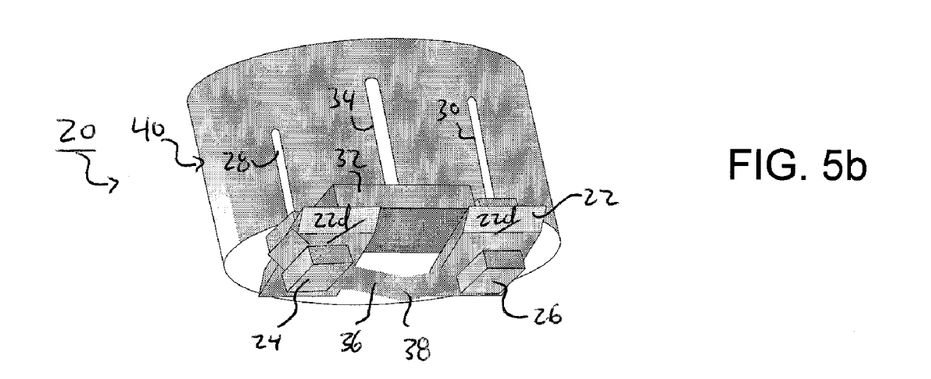
FIG. 5b illustrates a probe device according to another embodiment.

FIG. 5b illustrates another embodiment of a probe 20. In the probe 20 of FIG. 5b, the nanotube 36 is suspended between two pads 22d or regions of dielectric material 22. In this regard, the nanotube 36 is suspended between the first and second electrodes 24, 26. In this embodiment, the probe 20 avoids any charging effects that may develop when the nanotube 36 is in close proximity or contact with the dielectric material 22.

Figure 5C:
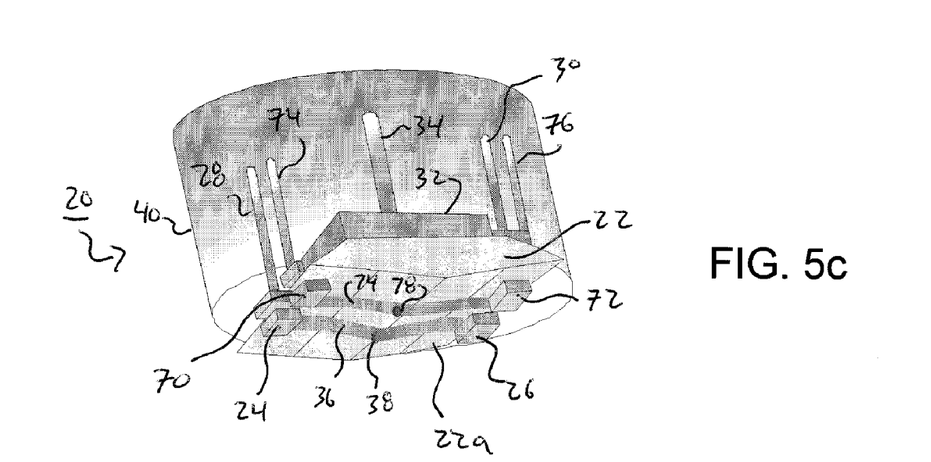
FIG. 5c illustrates a probe device according to another alternative embodiment.

FIG. 5c illustrates yet another embodiment of a probe 20. In this embodiment, a second pair of source and drain electrodes 70, 72 are provided on the first side 22a of the dielectric material 22. In addition, a second nanotube 74 is provided that connects the second pair of source and drain electrodes 70, 72. The second pair of source and drain electrodes 70, 72 are coupled to separate conductors 74, 76 disposed on the backside of the dielectric material 22. The second nanotube 74 also includes a tip region 78 where the nanotube 74 forms a point or apex. In this embodiment, an array-based probe 20 is formed. The probe 20 may be operated in rough and fine scan modes. For example, the probe 20 may be initially run in a rough scan mode to detect a signal of interest (e.g., a defect). Once the signal of interest is detected, the probe 20 may extract information about the defect by comparing the measured RTS amplitudes obtained via the first and second nanotubes 36, 74. The probe 20 can then be switched to a fine scan mode of operation where the probe 20 and/or sample holder 42 are moved in the general vicinity of the defect to obtain the maximum RTS amplitude. In this regard, the probe 20 is able to rapidly and accurately locate and characterize defects within a sample 44.

In the embodiments of the probe 20 described above, additional signal processing circuits (e.g., DSP signal processors) may be incorporated into the measurement circuitry to improve the sensitivity and resolution of the probe 20.

During operation of the probe 20, the microscope system 50 may operate in either a scanning mode or a characterizing mode. In the scanning mode, the probe 20 is used to identify and locate one or more defects 12 within a sample 44. In this mode, the tip portion 38 of the nanotube 36 is brought in close proximity to the sample 44. The sample 44 is then scanned by relative movement between the probe 20 and sample holder 42. The scanning may take place in a raster-like scan such that the surface of the sample 44 is scanned in an orderly fashion. In the scanning mode, the gate voltage ($V_g$) is typically fixed along with the source-drain biasing voltage ($V_{ds}$). The gate voltage ($V_g$) may be set to a value that corresponds to an anticipated defect 12 of interest. For example, the defect 12 may include a defect in the structure of the sample or it may include a contaminant (e.g., a molecule or atom). The source-drain biasing voltage ($V_{ds}$) is typically biased to a small value (e.g., on the order of mV) to avoid heating of the carriers in the nanoconductor 36 channels. The current (drain-source current ($I_{ds}$)) flowing through the nanoconductor 36 is then monitored and/or recorded. The scanning process may be repeated using different gate voltages ($V_g$) and source-drain biasing voltages ($V_{ds}$). In practice, the defects 12 or sites of interest are identified when RTS is observed from time domain measurements or there is enhanced noise power spectrum density from frequency measurements.

The number of defects in the sample 44 can be identified by observing the switching of the source-drain current ($I_{ds}$). The bi-state switching of the source-drain current ($I_{ds}$) of the type illustrated in FIG. 2b suggests the presence of a single defect 12 in the sample 44. In contrast, four-state switching of the source-drain current ($I_{ds}$) is indicative of two defects 12 in a sample 44.

As described above, the probe 20 may be run in a characterization mode in which the nature of the defect 12 is characterized. For example, the specific identity (molecular or atomic makeup) of the defect 12 may be characterized by the probe 20. In the characterization mode, the position of the probe 20 is typically fixed such that the nanotube 36 is positioned in close proximity to the defect 12. The gate voltage ($V_g$) is then scanned or swept across a range of voltages. The source-drain biasing voltage ($V_{ds}$) may be kept constant during the scanning process or it could be stepped to different values of interest.

In one embodiment of the invention, the defect 12 is characterized by calculating the emission and capture time constant ratio. This emission and capture time constant ratio—a so called kinetic parameter—may be calculated at different gate voltages ($V_g$). The emission and capture time ratio is a function of the amount of time the RTS current spends at the various amplitude states (e.g., switching amplitudes) over a period of time. With reference to FIG. 2b, the ratio is a function of the amount of time spent in emission (elevated source-drain current ($\alpha$ in FIG. 2b)) versus the amount of time spent in capture (non-elevated source-drain current ($\beta$ in FIG. 2b)). The rate of RTS switching can thus be used to characterize the defect 12.

The capture time the capture time ($\tau_c$) is defined by Equation 1 below:

$$\tau_c = 1/nv\sigma \quad (1)$$

where n is the hole carrier density per unit volume in the nanoconductor probe; v is the average carrier velocity in the probe; and $\sigma$ is the average capture cross-section. The emission time and capture time for the defect state is represented by Equation 2 below:

$$\frac{\tau_c}{\tau_e} = g \cdot \exp\left(\frac{E_T - E_F}{k_B T}\right) \quad (2)$$

where $\tau_e$ is the emission time; g is the energy level degeneracy of the trap; $E_T$ is the defect energy; $E_f$ is the Fermi energy of the nanowires or nanotubes; $k_B$ represents the Boltzman constant; and T is the carrier temperature. The capture time/emission time ratio shown in Equation 2 above can be used to characterize the nature of the defect 12.

In yet another aspect of the invention, the defect 12 may be characterized by the capture cross section. With the knowledge of n and v from the probe 20 design, $V_{ds}$ bias condition, and capture time ($\tau_c$), the capture cross section of the single defect 12 can be obtained from temperature dependence measurements.

The RTS current is typically sampled by the probe 20 at different rates depending on the RTS switching rate. Typically, a sampling speed of ten times higher than the highest time constants (emission time constant and/or capture time constant) is desired for accurate analysis. It is also possible to characterize the defect 12 by measuring the noise power spectrum density using a signal analyzer.

The probe 20 may also be used to determine the depth of a defect 12 on a sample 44. Generally, the probe 20 can determine depths up to several nanometers below the surface of the sample 44. In one aspect, the probe 20 is able to determine the physical depth of the defect 12 by measuring the time dependence of the RTS at different gate biasing voltages ($V_g$). For example, for depth determination, the emission and capture time ratio as a function of applied gate bias ($V_g$) can be determined via measurements of the sample 44. The relation between the change of the energy level of the defect 12 with respect to the Fermi energy of the nanoconductor 36 and the ratio of emission and capture time as a function of applied gate bias ($V_g$) is represented by Equation 3 below.

$$\frac{d(E_T - E_F)}{dV_g} = kT \frac{d\ln\left(\frac{1}{g} \cdot \frac{\tau_c}{\tau_e}\right)}{dV_g} \quad (3)$$

As can be seen from Equation 3, the gate dependence of the emission and capture ratio is related to the gate dependence of $E_T-E_f$. Moreover, the gate dependence of $E_T-E_f$ is determined by the defect location. In particular, the left term of Equation 3 is larger for a deep defect as compared to a shallow defect (e.g., closer to the sample surface). This difference can be exploited to extract information concerning the depth of the defect 12. For example, if the probe 12 is operated in a fully on state as in the operation of a FET, the change of Fermi energy due to the change of gate bias is small and, consequently, the distance of the defect from the probe 12 may be determined using Equation 4 below (where h represents the total thickness of the dielectric 22 (e.g., $SiO_2$)).

$$x = h * \frac{k_B T \cdot \left[\ln\left(\frac{1}{g} \cdot \frac{\tau_c}{\tau_e}\right)\Big|_{V_{g1}} - \ln\left(\frac{1}{g} \cdot \frac{\tau_c}{\tau_e}\right)\Big|_{V_{g2}}\right]}{V_{g1} - V_{g2}} \quad (4)$$

Figure 6A:
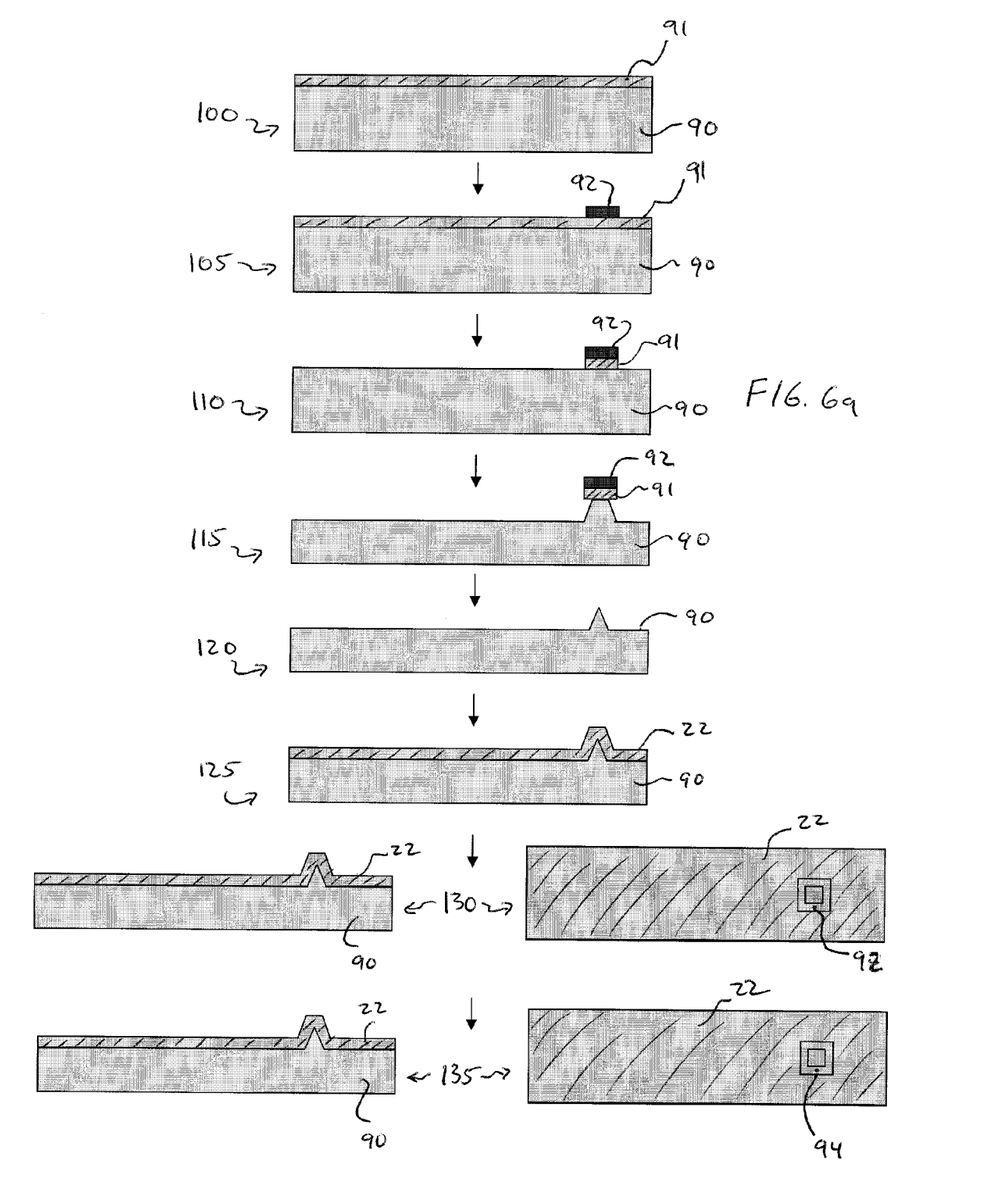
FIG. 6a illustrates a process flow diagram representing one embodiment of producing a microscope probe.
Figure 6B:
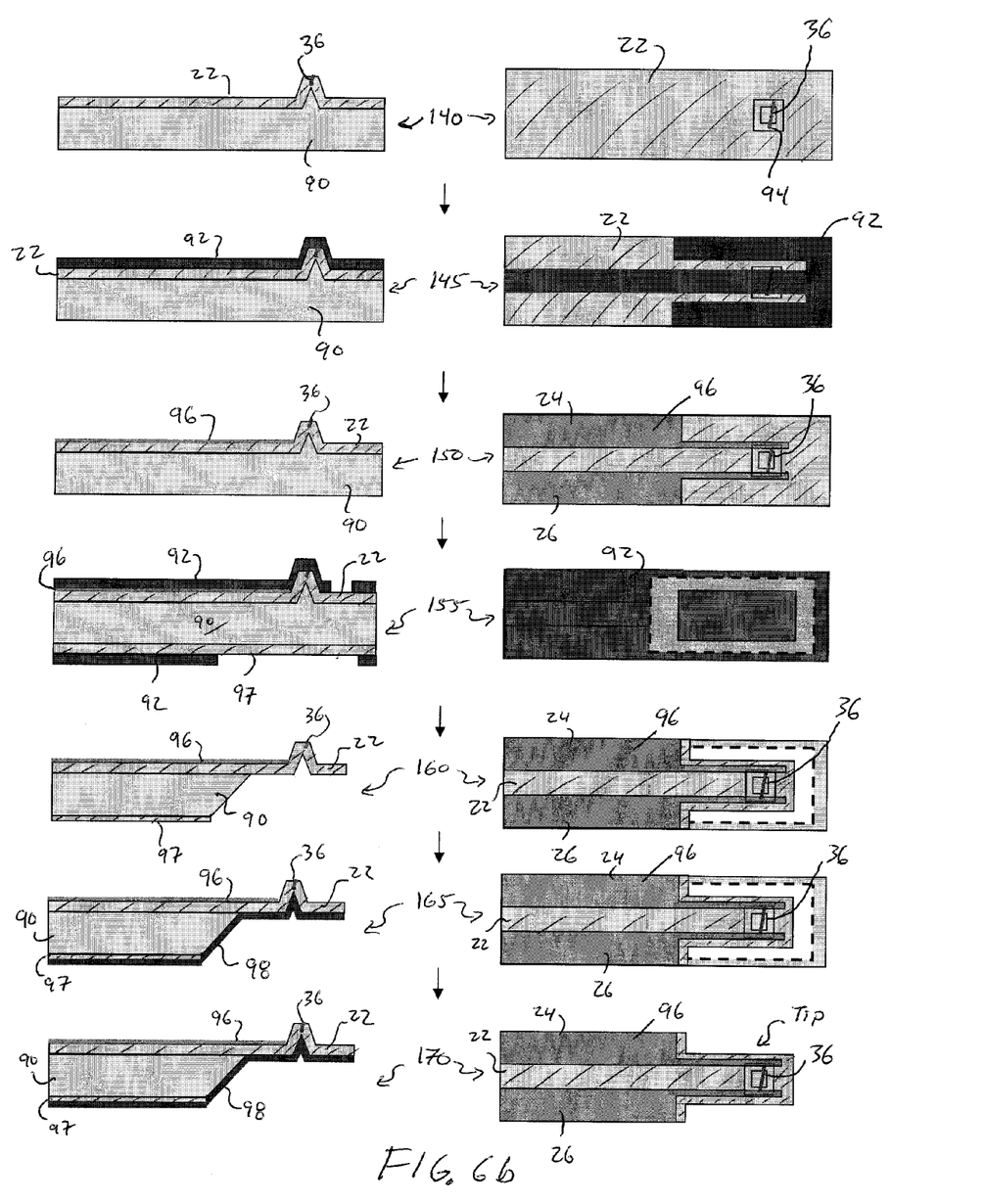

With reference now to FIGS. 6a and 6b, a process for making a microscope probe 20 will now be described. In step 100, a silicon substrate 90 is provided. A dielectric material 91 such as $SiO_2$ is deposited on the substrate 90. For example, the $SiO_2$ layer may be thermally grown. In step 105, the tip portion of the probe 20 is then patterned on the dielectric material 22 using a photoresist 92 and standard photolithographic techniques. In step 110, the exposed $SiO_2$ is then etched away (e.g., HF-based wet etchants or reactive ion etching). In step 115, the exposed silicon substrate 90 is then partially etched away using an anisotropic etchant (to form the tip structure). Examples of an anisotropic etchants for silicon include ethylenediamine/pyrocatechol/water (EDP) and KOH. In step 120, the photoresist 92 and $SiO_2$ located on the tip portion of the probe 20 is then removed. Also in step 120, the upper surface of the silicon substrate 90 is subject to additional etching. In step 125, the substrate 90 is subject to $SiO_2$ deposition to form the dielectric layer 22.

In step 130, a catalyst island is photolithographically patterned in the region where the nanotube 36 will be grown (steps 130 through 170 show cross-sectional side views as well as top-down views) using a photoresist 92. In step 135, the catalyst 94 is then deposited. The catalyst may include, for example, a gold (Au) particle in the case of silicon-based nanotubes 36. In step 140, the nanotube 36 is then grown across the catalyst island. Step 140 shows the growth of a silicon-based nanotube 36. Silicon-based nanowires 36 may be self-assembled using laser-assisted catalytic growth of the type disclosed in Cui Yi, et al., *Doping and Electrical Transport in Silicon Nanowires*, J. Phys., Chem. B, Vol. 104, No. 22, 2000, which is incorporated by reference as if set forth fully herein. It should be understood, however, that the nanotube 36 may be formed from other materials (e.g., carbon nanotube, Ge, ZnO). Moreover, the growth of the nanowire and/or nanotube on the island morphologies (e.g., tips) may be self-assembled to form the nanowire and/or nanotube into the probe tip position as is disclosed in Yang B, et al, *Template-Directed Carbon Nanotube Network Using Self-Organized Si Nanocrystals*, App. Phys. Lett. Vol. 86, Page 263107-1 to 263107-3 (2005). The Yang B. et al publication is incorporated by reference as if set forth fully herein.

In step, 145, photoresist 92 is again deposited for the formation of the source and drain electrodes 24, 26. Conventional photolithographic techniques may be used to selectively cover/expose selective regions of the probe 20. In step 150, a conductive species 96 is then deposited to form the source and drain electrodes 24, 26. For example, in the case of a silicon-based nanotube 36, the metallic species such as Al or Ti/Al may be deposited to form the electrodes 24, 26. If the nanotube 36 is carbon-based, palladium (Pd) may be more preferred.

In step 155, a layer of $SiO_2$ 97 is deposited on the backside of the probe 20, for example, by thermal growth. Also, a portion of the SiO$_2$ layer 97 is coated with a photoresist 92 to form the cantilevered structure for the probe 20. As seen in FIG. 6b (step 155) a portion of the backside of substrate 90 is exposed for subsequent etching. In step 160, the probe 20 is subject to an anisotropic etching process to form the cantilevered structure illustrated in FIG. 6b (step 160). For example, KOH may be used as the etchant to provide the anisotropic etching. In step 165, the backside of the probe 20 is then deposited with a metallic species 98 to form the gate electrode 32. For example, aluminum (Al) may be deposited. Of course, other metallic species may be deposited depending on the application of the probe 20. In step 170, the probe 20 is cut to form the tip structure. The probe 20 may be cut using standard chemical or mechanical cutting techniques. The publication entitled *Microfabrication of Cantilever Styli For The Atomic Force Microscope*, J. Vac. Sci. Technol. A, Vol. 8, No. 4, Jul./Aug. 1990 by Albrecht et al. is incorporated by reference as if set forth fully herein. This publication discloses certain manufacturing techniques that may be used to aid in the construction of the probe 20.

The probe 20 formed according to this process may be formed with three electrical contacts with one contact dedicated to the gate electrode 32 while the remaining two contacts are coupled, respectively, to the source and drain electrodes 24, 26. For example, the electrical contact for the gate electrode 32 may be positioned on the top side of the probe 20 while the contacts for the source and drain electrodes 24, 26 may be located on the backside of the probe 20. In this regard, the probe 20 can be inserted or otherwise plugged into a modified probe holder of a conventional AFM device. The modified probe holder would include three electrical contact points for forming electrical contact with the respective contacts for the gate electrode 32 and source/drain electrodes 24, 26.

The microscopy probe 20 thus uses the RTSs generated in one-dimensional devices such as nanotubes or nanowires 36 to identify and characterize single defects 12 and/or impurities present in a sample 44. The defects 12 may be molecular or even atomic based. In essence, the random telegraph signals (e.g., noise) becomes the signal that is used to identify defects 12. The probe 20 also offers excellent spatial resolution (on the order of one nanometer). Moreover, information acquired from the RTS current may be combined with data from atomic force microscopy to determine the morphology and other characteristics of the sample 44 with a high degree of sensitivity. For example, the location (three-dimensional position) and identity of the impurity or defect 12 can be determined using the probe 20. In addition, the energy of the impurity or defect 12 (e.g., material damage) may be determined to identify and/or distinguish the same from surrounding materials. The probe 20 may advantageously be used to test next-generation nanodevices and materials to ensure their workability and reliability.

The probe 20 provides numerous advantages over existing capacitance-based defect characterization methods. For example, the high signal-to-noise ratio of the probe 20 is an advantage over deep level transient spectroscopy (DLTS) techniques. Unlike DLTS-based devices, the sensitivity of the probe 20 does not decrease as the device area is scaled down. In fact, a shorter channel width will increase the sensitivity of the RTS-based probe 20. Moreover, compared to electron paramagnetic resonance (EPR) techniques the RTS-based probe 20 provides ultra-high sensitivity to detect single molecular or atomic defects/impurities 12. In addition, the RTS-based probe 20 may be combined with existing atomic force microscopy techniques to provide a detailed look at the morphology of the sample (including several nanometers beneath the surface).

The probe 20 also is non-destructive to the sample 44 or test device. Another advantage is that the probe 20 may operate under standard temperatures (e.g., room temperature) and pressures. For example, there is no need to cool the probe 20 or provide expensive equipment needed to form vacuum conditions. However, for certain measurements, such as particle spin observations, a low temperature environment may be required. As such, the probe 20 may be operated over a wide temperature range (from milli-Kelvin to above room temperature).

Another advantage of the probe 20 is that it can be manufactured using conventional semiconductor processing techniques, thereby enabling a relatively low manufacturing cost.

In addition to the defect identifying ability discussed herein, the probe 20 may also be used in a number of other applications. For instance, the probe 20 may be employed to characterize self-assembled nano-dots, nano-particles, and nanoconductors 36 (e.g., nanowires or nanotubes).

The probe 20 may also be used to detect, map, and manipulate the spin of a single atom. For this application, the probe 20 would be run at low temperature under an applied, external magnetic field. Certain "non-zero spin" particles can have a Zeeman splitting wherein the spin degenerates into either a spin-up state or a spin-down state. At low temperatures, the probe 20 may be implemented to extract the energy levels of each spin state. By combining this with existing resonance-based techniques like EPR and nuclear magnetic resonance (NMR), the probe 20 can detect and map information concerning particle spin. In addition, the spin of the particle may also be manipulated by controlling different metal contact and wire materials of the RTS tip region (e.g., half-metal contacts, spintronic wires such as LCMO nanowire). The time-resolved optical characteristics of a single molecule or atom may also be explored using, for example, laser imaging techniques.

The probe 20 may also be implemented as a photodetector since a single photon may be detected by the change in Fermi level. The Fermi level in the probe 20 is highly sensitive to the electron/hole created by the incident photon. The probe 20 may also be used to detect the presence of one or more chemical species. For example, a chemical or biological species (e.g., nucleic acid) may adhere or otherwise coat a surface. The presence of the adherent species can then be determined by the probe 20. For example, the carbon nanotube or nanowire 36 may be coated with a material that binds or otherwise has an affinity for a particular analyte. The time-resolved optical characteristics of a single molecule or atom may also be explored using, for example, laser imaging techniques.

In still another application, the probe 20 of the type described herein may be used to determine the small band gap of SWNTs. For example, in Liu et al., *Determination of the Small Band Gap of Carbon Nanotubes Using the Ambipolar Random Telegraph Signal*, Nano Letters, Vol. 5, No. 7, pp. 1333-1336, 2005 describes the use of CNT-FET for SWNT band gap measurements. The above-identified Liu et al. publication is incorporated by reference as if set forth fully herein.

While embodiments of the present invention have been shown and described, various modifications may be made without departing from the scope of the present invention. For example, as one modification, the probes 20 described herein may be formed with a plurality of nanotubes 36 connecting the source and drain electrodes 24, 26. In addition, instead of carbon-based nanotubes 36, the probe 20 may be formed with nanowires 36 (e.g., formed from $In_2O_3$). The invention, therefore, should not be limited, except to the following claims, and their equivalents.

What is claimed is:

1. A microscopy probe comprising:
   a substantially defect-free dielectric material having a first side and a second side;
   a first electrode and a second electrode disposed on a first side of the substantially defect-free dielectric material;
   a third electrode and a fourth electrode disposed on the first side of the substantially defect-free dielectric material;
   a first nanotube connecting the first electrode to the second electrode, the nanotube having a tip portion and a second nanotube connecting the third electrode to the fourth electrode, the second nanotube having a tip portion; and
   a gate electrode disposed on a second side of the substantially defect-free dielectric material.

2. The device of claim 1, further comprising a stage adapted to hold a test sample in close proximity to the probe.

3. The device of claim 2, wherein the microscopy probe is moveable relative to the sample in the x, y, and z directions.

4. The device of claim 1, further comprising current measurement circuitry coupled to the first, second, third, and fourth electrodes.

5. The device of claim 1, wherein the first and second nanotubes are formed as p-type semiconducting single-wall carbon nanotubes.

6. The device of claim 1, wherein the first side of the substantially defect-free dielectric material is formed with a tip region.

7. The device of claim 1, wherein at least a portion of the nanotubes are suspended between the first and second electrodes or the third and fourth electrodes.

8. The device of claim 1, wherein the probe is integrated with an atomic force microscope.

9. The device of claim 1, wherein the probe operates at room temperature.

10. The device of claim 1, further comprising control circuitry for applying a biasing voltage to the gate electrode.

11. A microscope device comprising:
    a probe comprising:
      a dielectric material having a first side and a second side;
      a first electrode and a second electrode disposed on the first side of the dielectric material;
      a first nanoconductor connecting the first electrode to the second electrode;
      a third electrode and a fourth electrode disposed on the first side of the dielectric material;
      a second nanoconductor connecting the third electrode to the fourth electrode;
      a gate electrode disposed on the second side of the dielectric material;
    a stage adapted for holding a sample, the stage being moveable with respect to the probe; and
    current measurement circuitry coupled to the first, second, third, and fourth electrodes.

12. The device of claim 11, further comprising imaging means for obtaining images of the sample, wherein the imaging means comprises an atomic force microscopy device.

13. The device of claim 11, wherein the first and second nanoconductors includes a tip region disposed between their respective electrodes.

14. The device of claim 11, wherein the first and second nanoconductors are formed as a nanotube or nanowire.

15. A method of detecting defects in a sample comprising:
    providing a probe comprising a dielectric material having a first side and a second side, a first electrode and a second electrode disposed on the first side of the dielectric material, a first nanotube connecting the first electrode to the second electrode, a third electrode and a forth electrode disposed on the first side of the dielectric material, a second nanotube connecting the third electrode to the fourth electrode, and a gate electrode disposed on a second side of the dielectric material;
    moving the first and second nanotubes in close proximity to the sample;
    measuring current flowing through the nanotubes; and
    detecting one or more defects based at least in part on the measured current flow.

16. The method of claim 15, wherein the Fermi energy of the nanotubes are adjusted by altering a voltage applied to the gate electrode or by altering a voltage at a source electrode.

17. The method of claim 15, further comprising the step of acquiring an image of the sample.

18. The method of claim 15, wherein the detection step determines defect position.

19. The method of claim 15, further comprising the step of subjecting the sample to electron paramagnetic resonance interrogation so as to obtain particle spin information from the sample.

* * * * *